US010127055B2

(12) United States Patent
Shih

(10) Patent No.: US 10,127,055 B2
(45) Date of Patent: Nov. 13, 2018

(54) ISCSI BASED BARE METAL OS IMAGE DEPLOYMENT AND DISKLESS BOOT

(71) Applicant: Quanta Computer Inc., Taoyuan (TW)

(72) Inventor: Ching-Chih Shih, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 14/980,637

(22) Filed: Dec. 28, 2015

(65) Prior Publication Data

US 2017/0109176 A1    Apr. 20, 2017

Related U.S. Application Data

(60) Provisional application No. 62/242,438, filed on Oct. 16, 2015.

(51) Int. Cl.
*G06F 9/44* (2018.01)
*G06F 9/4401* (2018.01)

(52) U.S. Cl.
CPC .......... *G06F 9/4416* (2013.01); *G06F 9/4406* (2013.01); *G06F 9/4408* (2013.01)

(58) Field of Classification Search
CPC .............................. G06F 9/4416; G06F 9/4406
See application file for complete search history.

(56) References Cited

U.S. PATENT DOCUMENTS

| | | | | |
|---|---|---|---|---|
| 7,747,847 | B2 * | 6/2010 | El Zur | G06F 9/4416 709/222 |
| 7,882,562 | B2 * | 2/2011 | Arroyo | H04L 63/08 726/26 |
| 8,245,022 | B2 * | 8/2012 | Mittapalli | G06F 9/4416 713/2 |
| 2008/0301425 | A1 * | 12/2008 | Mittapalli | G06F 9/4416 713/2 |
| 2013/0227261 | A1 * | 8/2013 | Anderson | G06F 9/4401 713/2 |
| 2014/0089649 | A1 * | 3/2014 | Chaganti | G06F 9/4401 713/2 |

FOREIGN PATENT DOCUMENTS

| | | |
|---|---|---|
| CN | 1996253 A | 7/2007 |
| CN | 102117233 A | 7/2011 |
| TW | 200820667 A | 5/2008 |

OTHER PUBLICATIONS

Taiwanese Office Action for Application No. 105105922 dated Jan. 23, 2017 w/ First Office Action Summary.

\* cited by examiner

*Primary Examiner* — Stefan Stoynov
(74) *Attorney, Agent, or Firm* — Nixon Peabody LLP; Eduardo J. Quiñones

(57) ABSTRACT

Various examples of the present technology provide a method for iSCSI based bare metal OS image deployment and diskless boot in a server system. In some examples, methods for iSCSI based bare metal OS image deployment and diskless boot in a server system comprise setting a boot order of a BIOS of the server system to iSCSI NIC of a controller (e.g., BMC) of the server system, setting iSCSI boot configuration to the controller, updating the boot order based at least upon information from the controller, syncing the iSCSI boot configuration to the BIOS of the server system based upon the information from the controller, and causing the server system to be booted from a specific target IP and LUN of an iSCSI storage server of a SAN.

20 Claims, 8 Drawing Sheets

ISCSI BASED BARE METAL OS IMAGE DEPLOYMENT AND DISKLESS BOOT

CROSS-REFERENCE TO RELATED APPLICATION

This application claims priority to U.S. Provisional Application No. 62/242,438, filed Oct. 16, 2015, the disclosure of which is incorporated herein by reference in its entirety.

TECHNICAL FIELD

The present technology generally relates to a server system in a telecommunications network and more particularly relates to bare metal OS image deployment and diskless boot in a server system.

BACKGROUND

Modern server farms or datacenters typically employ a large number of servers to handle processing needs for a variety of application services. It's important for an administrator or user of a datacenter to remotely configure or boot servers of the datacenter. In conventional systems, a Pre-boot Execution Environment (PXE) is used for remotely booting or deploying software onto servers. The PXE code is typically delivered on a read-only memory (ROM) chip or boot disk of a server such that the server can be remotely configured and booted.

However, it remains a challenge to provide a faster, more cost-efficient and more reliable way for remotely deploying software onto server systems.

SUMMARY

Systems and methods in accordance with various examples of the present technology provide a solution to the above-mentioned problems by using Internet Small Computer System Interface (iSCSI) based protocols in bare metal OS image deployment and diskless boot of a server system. More specifically, various examples of the present technology provide methods for iSCSI based bare metal OS image deployment and diskless boot of a server system by setting a boot order of a basic input/output system (BIOS) of the server system to an iSCSI network interface controller (NIC) of a controller (e.g., Baseboard Management Controller (BMC)) of the server system, setting iSCSI boot configuration of the server system to the controller, updating the boot order based at least upon information from the controller, syncing the iSCSI boot configuration to the BIOS of the server system based upon the information from the controller, and causing the server system to be booted from a specific target IP and Logical Unit Number (LUN) of an iSCSI storage server of a Storage Area Network (SAN). The present technology is advantageous over conventional solutions, particularly for systems with iSCSI based adapter(s).

In some examples, an iSCSI boot configuration is synced to a BIOS of the server system by the BIOS or a controller of the server system. The BIOS of the server system can be a Unified Extensible Firmware Interface (UEFI) BIOS. In some examples, an iSCSI boot configuration is synced to an iSCSI Host Bus Adapter (HBA) of the server system by a BIOS or a controller of the server system.

Some examples provide methods for iSCSI based diskless boot in a server system by setting a boot order of a BIOS of the server system to an iSCSI NIC of a controller (e.g., a BMC) of the server system, setting iSCSI boot configuration to the controller, updating the boot order based at least upon information from the controller, syncing the iSCSI boot configuration to the BIOS of the server system based upon the information from the controller, booting a diskless Random-Access Memory (RAM) disk loader from an iSCSI target of the server system, causing the diskless RAM disk loader to get a target OS image from an iSCSI storage server of a SAN and load the target OS image to a RAM of the server system, and switching an operation system (OS) of the server system to the target OS image stored in the RAM. In some examples, the iSCSI boot configuration is synced to an iSCSI Host Bus Adapter (HBA) or the BIOS of the server system by the BIOS or the controller of the server system. The BIOS of the server system can be a UEFI BIOS.

Some examples provide methods for iSCSI based bare metal OS image deployment in a server system by setting a boot order of a BIOS of the server system to an iSCSI NIC of a controller (e.g., a BMC) of the server system, setting iSCSI boot configuration to the controller, updating the boot order based at least upon information from the controller, syncing the iSCSI boot configuration to the BIOS of the server system based upon the information from the controller, booting an iSCSI boot deployment service of the server system from an iSCSI target of the server system, and causing the iSCSI boot deployment service to get a target OS image from an iSCSI storage server of a SAN and clone the target OS image to a local disk of the server system.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION

Various examples of the present technology provide systems and methods for iSCSI based bare metal OS image deployment and diskless boot in a server system. In some examples, methods for iSCSI based bare metal OS image deployment and diskless boot in a server system comprise setting a boot order of a BIOS of the server system to iSCSI NIC of a controller (e.g., BMC) of the server system, setting iSCSI boot configuration to the controller, updating the boot order based at least upon information from the controller, syncing the iSCSI boot configuration to the BIOS of the server system based upon the information from the controller, and causing the server system to be booted from a specific target IP and LUN of an iSCSI storage server of a SAN.

Figure 1A:
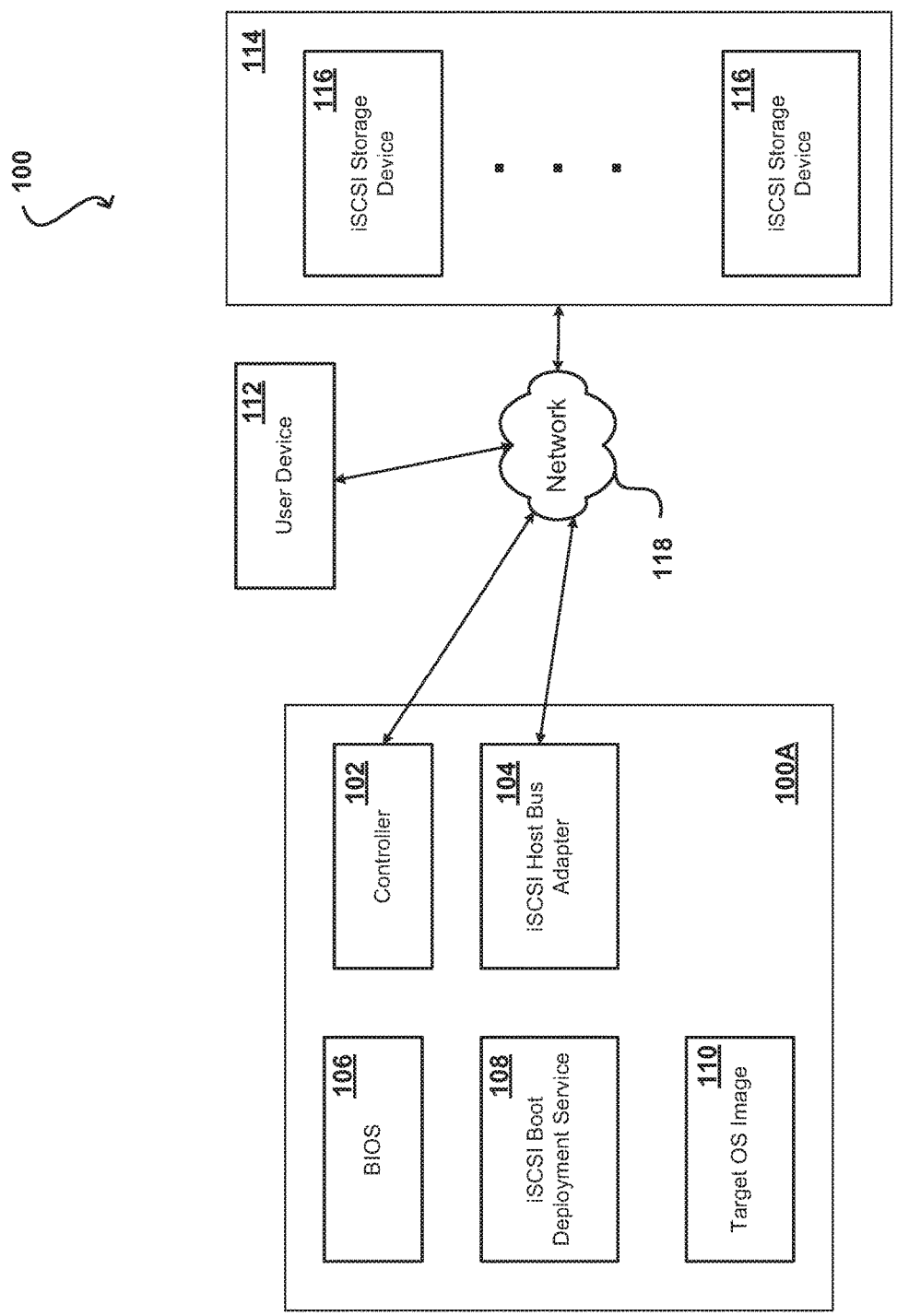
FIGS. 1A and 1B illustrate schematic block diagrams of an exemplary system configured to support iSCSI based bare metal OS image deployment and diskless boot in accordance with an implementation of the present technology.

FIG. 1A illustrates a schematic block diagram of an exemplary system 100 configured to support iSCSI based bare metal OS image deployment in accordance with an implementation of the present technology. The exemplary system 100 comprises a server system 100A and a Storage Area Network (SAN) 114 that includes at least one iSCSI storage device 116. The server system 100A and the SAN 114 are coupled to a user device 112 and connected to each other via a network 118. An iSCSI protocol is used to transmit data over the network 118 (e.g., a local area network (LAN) wide area network (WAN) or Internet) and enables location-independent data storage and retrieval.

In this example, the server system 100A includes a controller 102 (e.g., a baseboard management controller (BMC) or a rack management controller (RMC)), a basic input/output system (BIOS) 106, an iSCSI Host Bus Adapter (HBA) 104, an iSCSI Boot Deployment Service 108, and a Target OS image 110.

The controller 102, the BIOS 106 and the iSCSI HBA 104 are configured to receive an iSCSI boot configuration. The iSCSI boot configuration comprises an iSCSI initiator name, iSCSI initiator configuration (e.g., Dynamic Host Configuration Protocol (DHCP) settings, or a static IP, subnet mask and Gateway settings), iSCSI target information that includes a target name (e.g., the iSCSI storage device 114), target IP (e.g., 192.168.0.1), and boot Logical Unit Number (LUN) (e.g., LUN=0), and iSCSI Challenge Handshake Authentication (CHAP) configuration. The iSCSI CHAP is used to verify the legitimacy of the iSCSI initiator that accesses the target over the network 118.

In this example, an iSCSI initiator implements an iSCSI protocol by using a network interface controller (NIC) and network stack to emulate iSCSI devices for the server system 100A. The iSCSI initiator can be either a software initiator or a hardware initiator. A hardware iSCSI initiator (e.g., the iSCSI HBA 104 or an iSCSI offload engine (iSOE)) may include a PCI option ROM and allow the server system 100A to boot from the SAN 114. From perspective of an OS of the server system 100A, the iSCSI HBA 104 appears to include a NIC, a TCP/IP offload engine (TOE), and a SCSI bus adapter. The iSCSI HBA 104 or the iSOE can offload the iSCSI initiator's operations from a processor of the server system 100A, and frees up CPU cycles of the processor for main host applications. In some examples, the initiator and a target can be coupled via a Serial Attached SCSI (SAS) bus, a Fibre Channel (FC), or an Internet Protocol (IP) connection.

In this example, a BIOS boot order of the server system 100A can be set at an iSCSI NIC (e.g., the iSCSI HBA 104) from the controller 102 and an iSCSI boot configuration of the server system 100A can be set at the controller 102. The BIOS boot order and iSCSI boot configuration can be set manually by an administrator of the user device 112 or automatically by the controller 102. The boot order of the server system 100A can be dynamically updated based upon information from the controller 102. The iSCSI boot configuration of the controller 102 can be synced to the iSCSI HBA 104 or an UEFI BIOS (e.g., the BIOS 106). The BIOS 106 or the controller 102 can boot the iSCSI Boot Deployment Service 108 from an iSCSI target (e.g., an iSCSI storage device 116). The iSCSI Boot Deployment Service 108 can get a target OS image from the iSCSI target and clone the target OS image onto a local disk of the server system 100A.

In some examples, in the events that a local disk of the server system 100A fails or the server system 100A does not have a local disk, the BIOS 106 or the controller 102 can boot the server system 100A from a specific target IP and LUN of the SAN 114.

Figure 1B:
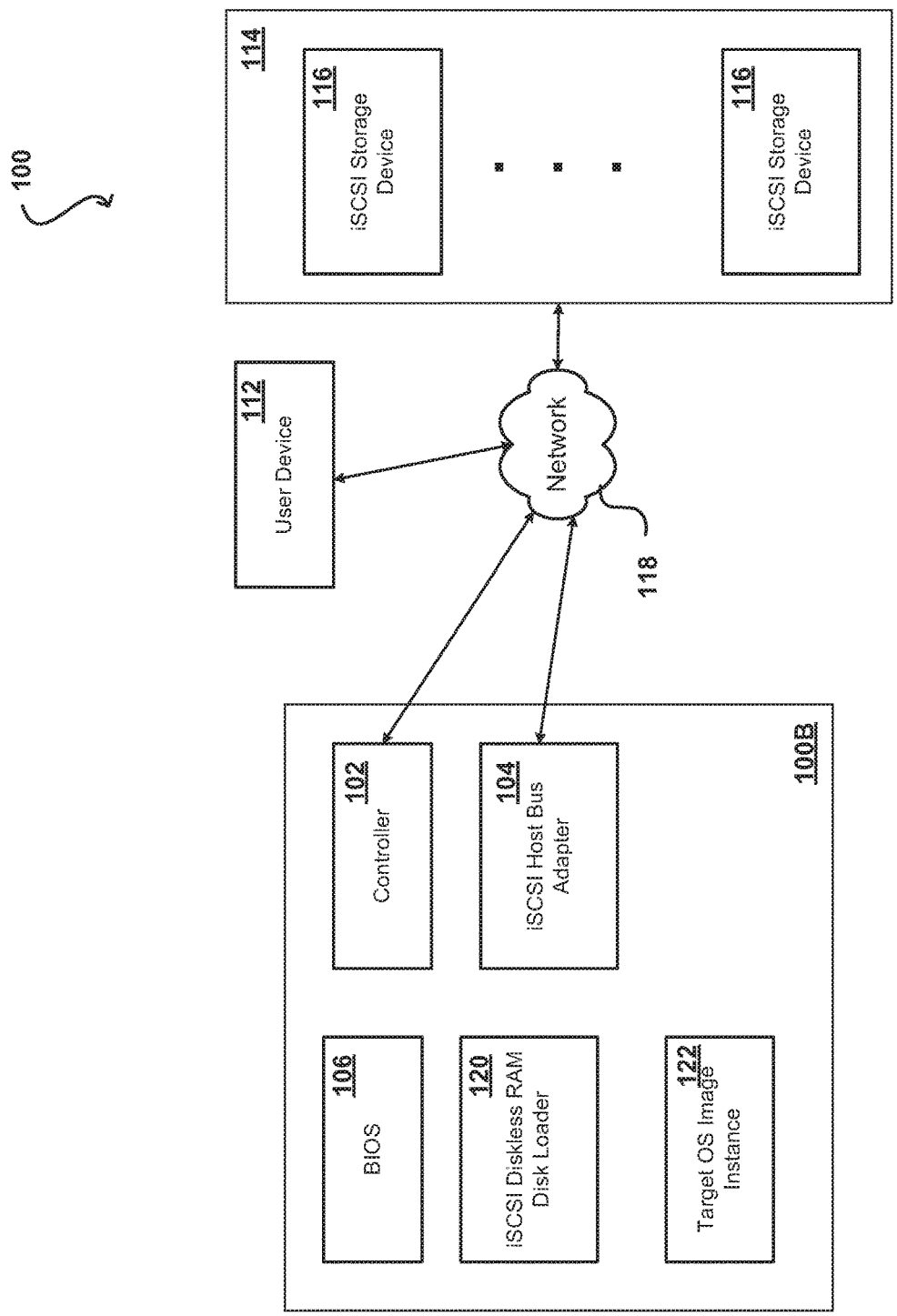

FIG. 1B illustrates a schematic block diagram of another exemplary system 100 configured to support iSCSI based diskless boot in accordance with an implementation of the present technology. The exemplary system 100 comprises a server system 100B and the Storage Area Network (SAN) 114 including at least one iSCSI storage device 116. The server system 100B and the SAN 114 are coupled to the user device 112 and connected to each other via the network 118. An iSCSI protocol is used to transmit data over the network 118 and enables location-independent data storage and retrieval.

In this example, the server system 100B includes the controller 102 (e.g., a baseboard management controller (BMC) or a rack management controller (RMC)), the BIOS 106, the iSCSI HBA 104, an iSCSI Diskless RAM Disk Loader 120, and a target OS image instance 122.

The controller 102, the BIOS 106 and the iSCSI HBA 104 are configured to receive an iSCSI boot configuration. The iSCSI boot configuration comprises an iSCSI initiator name, iSCSI initiator configuration (e.g., DHCP settings, or a static IP, subnet mask and Gateway settings), iSCSI target information that includes a target name (e.g., the iSCSI storage device 114), target IP (e.g., 192.168.0.1), LUN (e.g., LUN=0), and iSCSI CHAP configuration.

In this example, a BIOS boot order of the server system 100B can be set at an iSCSI NIC (e.g., the iSCSI HBA 104) from the controller 102 and an iSCSI boot configuration can be set at the controller 102. The BIOS boot order and iSCSI boot configuration can be set manually by an administrator of the user device 112 or automatically by the controller 102. The boot order of the server system 100B can be dynamically updated based upon information from the controller 102. The iSCSI boot configuration of the controller 102 can be synced to the iSCSI HBA 104 or an UEFI BIOS (e.g., the BIOS 106). The BIOS 106 or the controller 102 can boot an iSCSI Diskless RAM Disk Loader 120 from an iSCSI target (e.g., an iSCSI storage device 116). The iSCSI Diskless RAM Disk Loader 120 can get a target OS image from the iSCSI target and load the target OS image onto a RAM of the server system 100B. The OS of the server system 100B can be switched to the target OS image stored in the RAM to complete an iSCSI based diskless boot on the server system 100B.

Figure 1C:
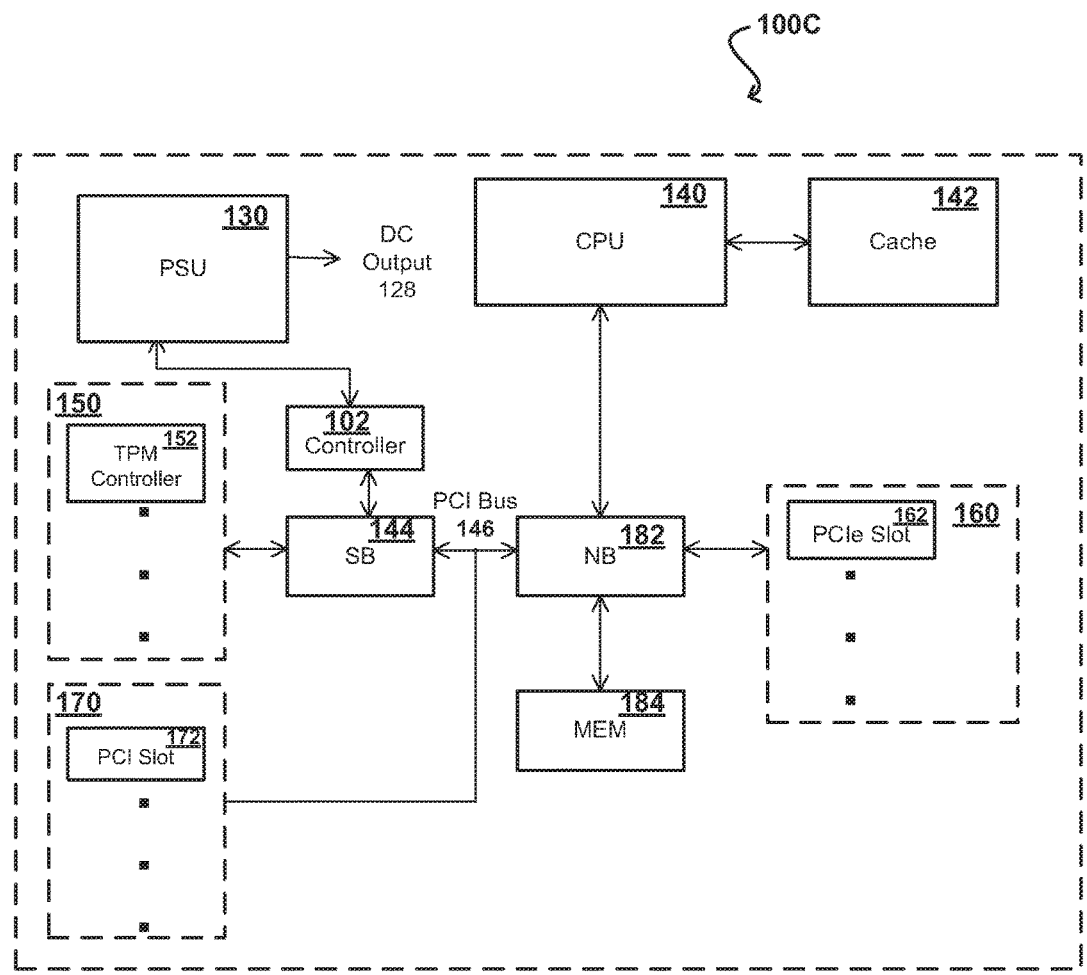
FIG. 1C illustrates a schematic block diagram of an exemplary server system in accordance with an implementation of the present technology.

FIG. 1C illustrates a schematic block diagram of an exemplary system 100 containing a server system 100C in accordance with an implementation of the present technology. In this example, the server system 100C comprises at least one microprocessor or CPU 140 connected to a Cache 142, a main Memory 184, and one or more PSUs 130 that provides power to the server system 100C. The main Memory 184 can be coupled to the CPU 140 via a north bridge (NB) logic 182. A memory control module (not shown) can be used to control operations of the Memory 184 by asserting necessary control signals during memory operations. The main Memory 184 may include, but is not limited to, dynamic random access memory (DRAM), double data rate DRAM (DDR DRAM), static RAM (SRAM), or other types of suitable memory.

In some implementations, the CPU 140 can be multi-core processors, each of which is coupled together through a CPU bus connected to the NB logic 182. In some implementations, the NB logic 182 can be integrated into the CPU 140. The NB logic 182 can also be connected to a plurality of peripheral component interconnect express (PCIe) ports 160 and a south bridge (SB) logic 144 (optional). The plurality of PCIe ports 160 can be used for connections and buses such as PCI Express x1, USB 2.0, SMBus, SIM card, future extension for another PCIe lane, 1.5 V and 3.3 V power, and wires to diagnostics LEDs on the server's chassis.

In this example, the NB logic 182 and the SB logic 144 are connected by a peripheral component interconnect (PCI) Bus 146. A PCI Bus can support function on the CPU 140 but in a preferably standardized format that is independent of any of CPU's native buses. The PCI Bus 146 can be further connected to a plurality of PCI slots 170 (e.g., a PCI Slot 172). Devices connected to the PCI Bus 146 may appear to a bus controller (not shown) to be connected directly to a CPU bus, assigned addresses in the CPU 140's address space, and synchronized to a single bus clock. PCI cards can be used in the plurality of PCI slots 170 include, but are not limited to, network interface cards (NICs), sound cards, modems, TV tuner cards, disk controllers, video cards, small computer system interface (SCSI) adapters, and personal computer memory card international association (PCMCIA) cards.

The SB logic 144 can couple the PCI Bus 146 to a plurality of peripheral IO devices 150 (e.g., a TPM controller 152) via an expansion bus. The expansion bus can be a bus used for communications between the SB logic 144 and peripheral devices, and may include, but is not limited to, an industry standard architecture (ISA) bus, PC/104 bus, low pin count bus, extended ISA (EISA) bus, universal serial bus (USB), integrated drive electronics (IDE) bus, or any other suitable bus that can be used for data communications for peripheral devices.

In the example, the SB logic 144 is further coupled to a controller 102 that is connected to the one or more PSUs 130. The one or more PSUs 130 are configured to supply powers to various component of the server system 100C, such as the CPU 140, Cache 142, NB logic 182, PCIe slots 162, Memory 184, SB logic 144, peripheral IO devices 150, PCI slots 170, and controller 102. After being powered on, the server system 100C is configured to load software application from memory, computer storage device, or an external storage device to perform various operations.

In some implementations, the controller 102 can be a baseboard management controller (BMC), rack management controller (RMC), a keyboard controller, or any other suitable type of system controller. In some embodiments, the controller 102 can be configured to control operations of the server system 100C and/or communicate with an administrator over a network.

In some implementations, the controller 102 can receive a command from an administrator over the network 118 and provide information to update a boot order of the server system 100C. The controller 102 can further sync an iSCSI boot configuration to a BIOS or an iSCSI HBA of the server system 100C and cause the server system 100C to be booted from a specific target IP and LUN of an iSCSI storage server of a SAN.

In some implementations, the controller 102 can sync an iSCSI boot configuration to a BIOS or an iSCSI HBA of the server system 100C, boot a diskless RAM disk loader of the server system 100C from an iSCSI target of the server system 100C, boot an iSCSI boot deployment service of the server system 100C from an iSCSI target of the server system 100C, and cause the iSCSI boot deployment service to get a target OS image from the iSCSI target and clone the target OS image to a local disk of the server system 100C.

In some implementations, the controller 102 can sync an iSCSI boot configuration to a BIOS or an iSCSI HBA of the server system 100C, boot a diskless RAM disk loader of the server system 100C from an iSCSI target of the server system 100C, cause the diskless RAM disk loader to get a target OS image from the iSCSI target and load the target OS image to a RAM of the server system 100C, and cause an OS of the server system to be switched to the target OS image stored in the RAM.

In some implementations, the controller 102 can collect parameters (e.g., temperature, cooling fan speeds, power status, memory and/or operating system (OS) status) from different types of sensors that are built into the server system 100. In some implementations, the controller 102 can also be configured to take appropriate action when necessary. For example, in response to any parameter on the different types of sensors that are built into the server system 100C going beyond preset limits, which can indicate a potential failure of the server system 100C, the controller 102 can be configured to perform a suitable operation in response to the potential failure. The suitable operation can include, but is not limited to, sending an alert to the CPU 140 or a system administrator over a network, or taking some corrective action such as resetting or power cycling the node to get a hung OS running again).

Although only certain components are shown within the server systems 100A, 100B and 100C in FIGS. 1A, 1B and 1C, respectively, various types of electronic or computing components that are capable of processing or storing data, or receiving or transmitting signals can also be included in the server systems 100A, 100B and 100C in FIGS. 1A, 1B and 1C, respectively. Further, the electronic or computing components in the server systems 100A, 100B and 100C in FIGS. 1A, 1B and 1C, respectively, can be configured to execute various types of application and/or can use various types of operating systems. These operating systems can include, but are not limited to, Android, Berkeley Software Distribution (BSD), iPhone OS (iOS), Linux, OS X, Unix-like Real-time Operating System (e.g., QNX), Microsoft Windows, Window Phone, and IBM z/OS.

Depending on the desired implementation for the server systems 100A, 100B and 100C in FIGS. 1A, 1B and 1C, respectively, a variety of networking and messaging protocols can be used, including but not limited to TCP/IP, open systems interconnection (OSI), file transfer protocol (FTP), universal plug and play (UPnP), network file system (NFS), common internet file system (CIFS), AppleTalk etc. As would be appreciated by those skilled in the art, the server systems 100A, 100B and 100C in FIGS. 1A, 1B and 1C are used for purposes of explanation. Therefore, a network system can be implemented with many variations, as appropriate, yet still provide a configuration of network platform in accordance with various embodiments of the present technology.

In exemplary configuration of FIGS. 1A, 1B and 1C, the server systems 100A, 100B and 100C can also include one or more wireless components operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections, as known in the art. Various other elements and/or combinations are possible as well within the scope of various embodiments.

Figure 2A:
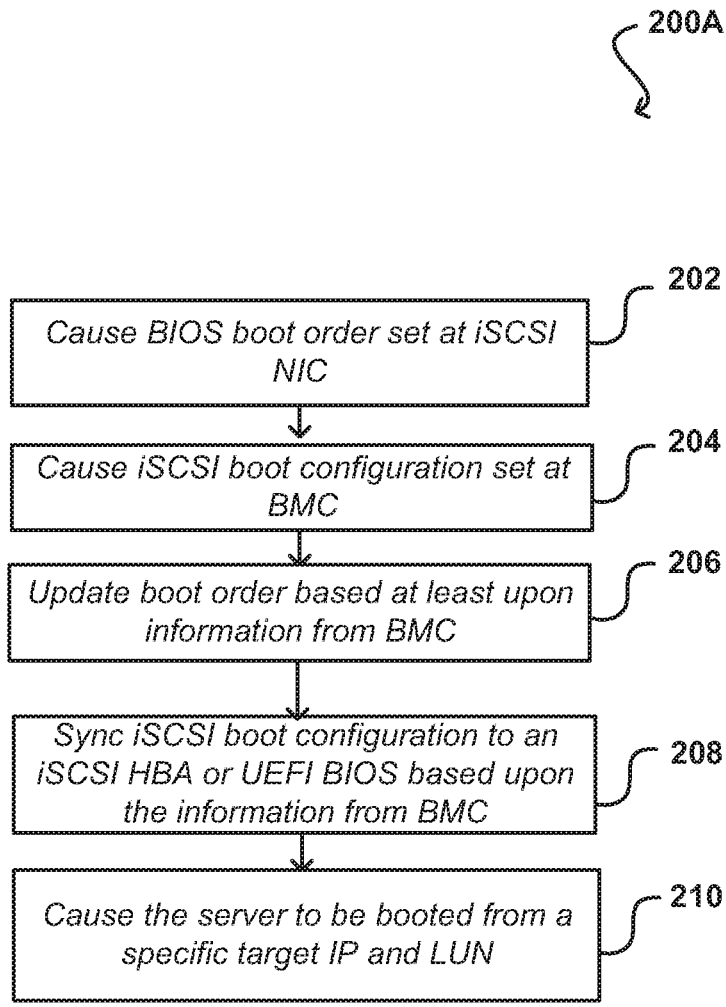
FIGS. 2A, 2B, and 2C illustrate exemplary methods for iSCSI based bare metal OS image deployment and diskless boot in accordance with an implementation of the present technology.

FIG. 2A illustrates an exemplary method 200A for iSCSI based bare metal OS image deployment and diskless boot in a server system in accordance with an implementation of the present technology. It should be understood that the exemplary method 200A is presented solely for illustrative purposes and that in other methods in accordance with the present technology can include additional, fewer, or alternative steps performed in similar or alternative orders, or in parallel. The exemplary method 200A starts with setting a BIOS boot order of the server system to an iSCSI NIC from a controller of the server system (e.g., as illustrated in FIGS. 1A, 1B and 1C), at step 202, and setting an iSCSI boot configuration to the controller of the server system (e.g., as illustrated in FIGS. 1A, 1B and 1C), at step 204. In some examples, the BIOS boot order and iSCSI boot configuration of the server system can be set manually by an administrator of a remote user device, or automatically by the controller or a BIOS of the server system.

At step 206, the BIOS of the server system can update the boot order based at least upon information for the controller of the server system. At step 208, the BIOS of the server system can sync an iSCSI boot configuration to an iSCSI HBA of the server system based upon the information from the controller. In some examples, the controller of the server system can sync an iSCSI boot configuration to an iSCSI HBA or an UEFI BIOS of the server system.

At step 210, the controller or the BIOS of the server system can cause the server system to be booted from a specific target IP and LUN of an iSCSI storage server of a SAN based upon the iSCSI boot configuration.

Figure 2B:
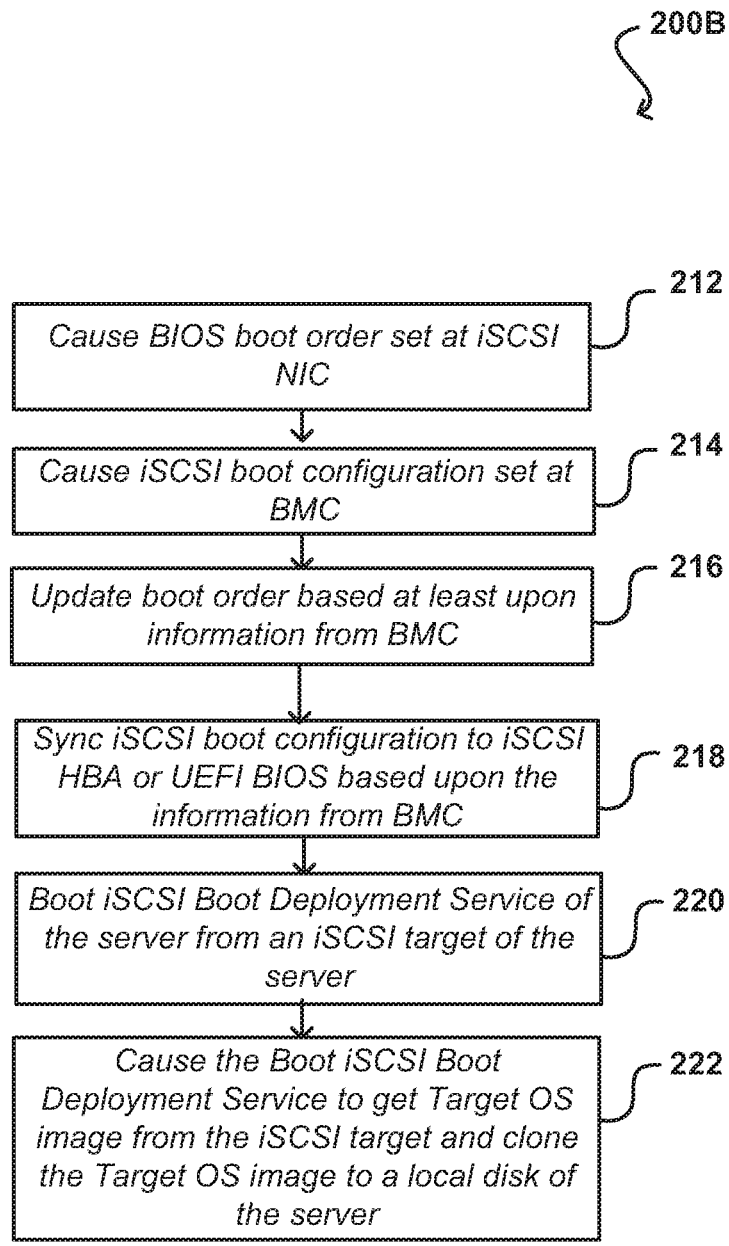

FIG. 2B illustrates an exemplary method 200B for iSCSI based bare metal OS image deployment in a server system in accordance with an implementation of the present technology. The exemplary method 200B starts with setting a BIOS boot order of the server system to an iSCSI NIC from a controller of the server system (e.g., as illustrated in FIG. 1A), at step 212, and setting an iSCSI boot configuration to the controller of the server system (e.g., as illustrated in FIG. 1A), at step 214. At step 216, the BIOS of the server system can update the boot order of the server system based at least upon information for the controller of the server system. At step 218, the BIOS of the server system can sync an iSCSI boot configuration to an iSCSI HBA of the server system based upon the information from the controller. In some examples, the controller of the server system can also sync the iSCSI boot configuration to the iSCSI HBA or the BIOS of the server system.

At step 220, the controller or the BIOS of the server system can boot an iSCSI Boot Deployment Service of the server system from an iSCSI target of the server system (e.g., as illustrated in FIG. 1A). At step 222, the iSCSI Boot Deployment Service can get a target OS image from the iSCSI target and clone the target OS image to a local disk of the server system (e.g., as illustrated in FIG. 1A). The server system can boot from the local disk of the server system according to saved target OS image.

Figure 2C:
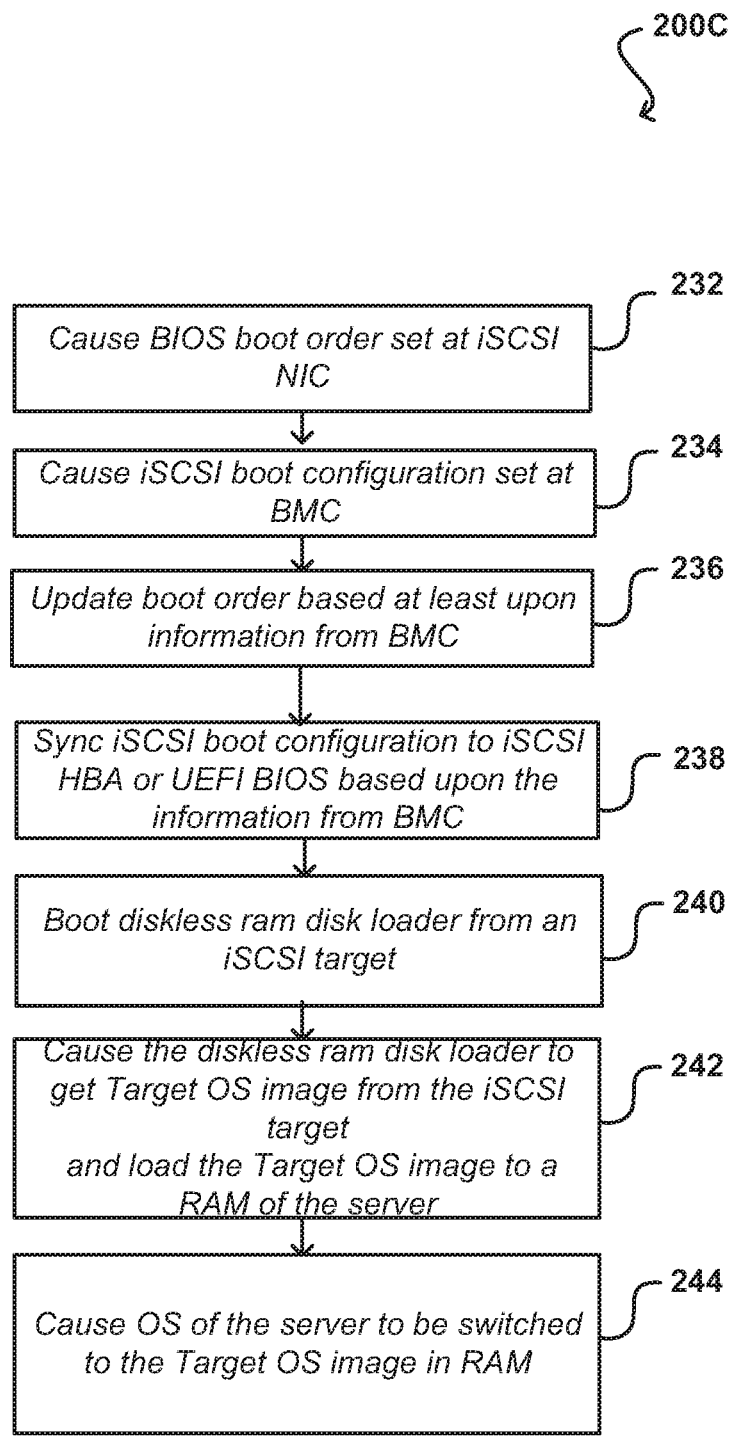

FIG. 2C illustrates an exemplary method 200C for an iSCSI based diskless boot in a server system in accordance with an implementation of the present technology. The exemplary method 200C starts with setting a BIOS boot order of the server system to an iSCSI NIC from a controller of the server system (e.g., as illustrated in FIG. 1B), at step 232, and setting an iSCSI boot configuration to the controller of the server system (e.g., as illustrated in FIG. 1B), at step 234. At step 236, the BIOS of the server system can update the boot order of the server system based at least upon information for the controller of the server system. At step 238, the BIOS of the server system can sync an iSCSI boot configuration to an iSCSI HBA of the server system based upon the information from the controller. In some examples, the controller of the server system can also sync the iSCSI boot configuration to the iSCSI HBA or the BIOS of the server system.

At step 240, the controller or the BIOS of the server system can boot an iSCSI Diskless RAM Disk Loader of the server system from an iSCSI target of the server system (e.g., as illustrated in FIG. 1B). At step 242, the iSCSI Diskless RAM Disk Loader can get a target OS image from the iSCSI target and load the target OS image to a RAM of the server system (e.g., as illustrated in FIG. 1B). The BIOS or controller of the server system can switch an OS of the server system to the target OS image stored in the RAM, at step 244.

Terminologies

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to pre-defined protocols, such as the Transmission Control Protocol/Internet Protocol (TCP/IP). In this context, a protocol can refer to a set of rules defining how the nodes interact with each other. Computer networks can be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments, networks, devices, ports, physical or logical links, and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources can include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources can be used to support virtual networks, virtual machines (VM), databases, applications (Apps), etc.

Cloud computing resources can include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

Figure 3:
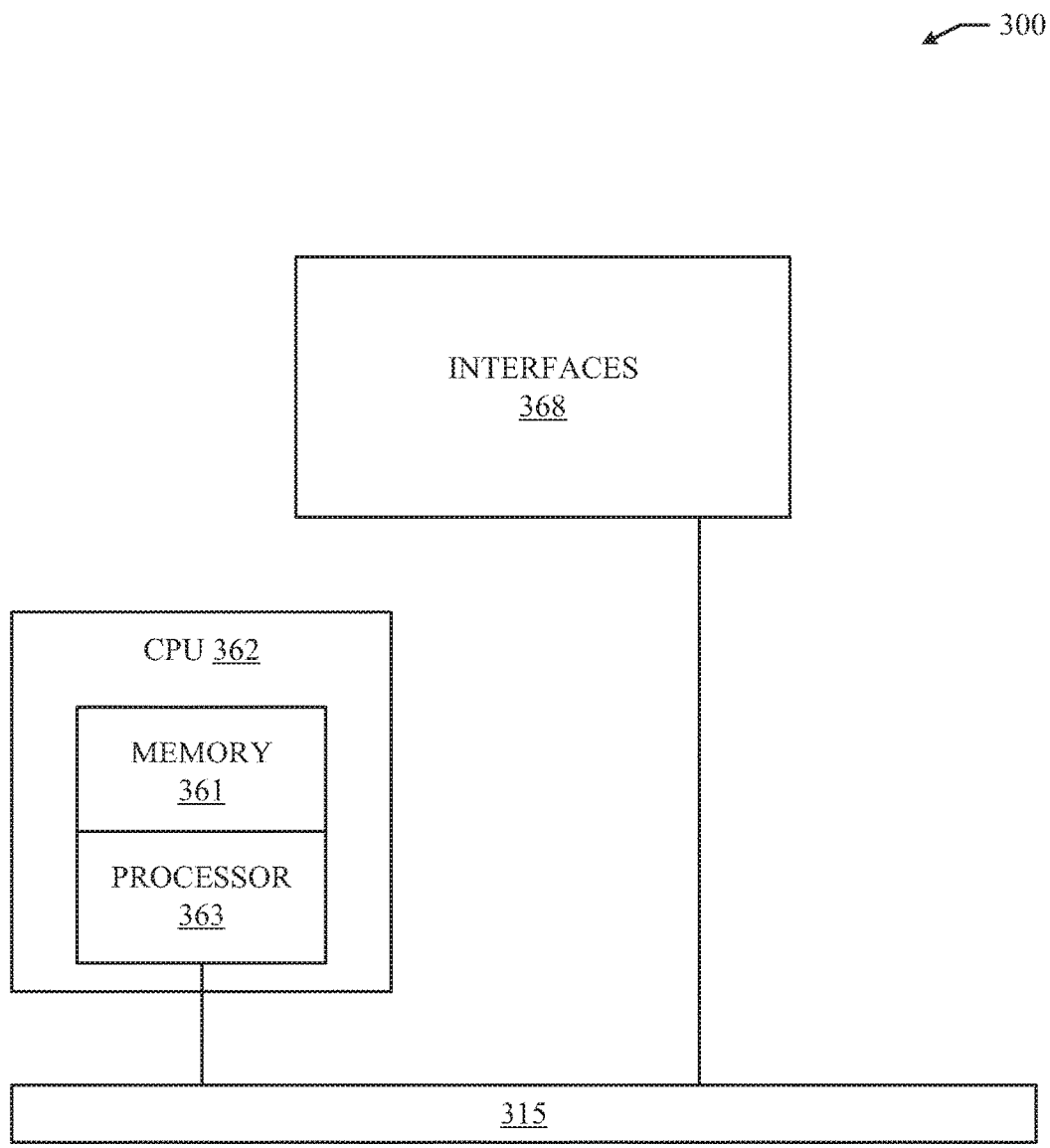
FIG. 3 illustrates an exemplary computing device in accordance with various implementations of the technology.
Figure 4:
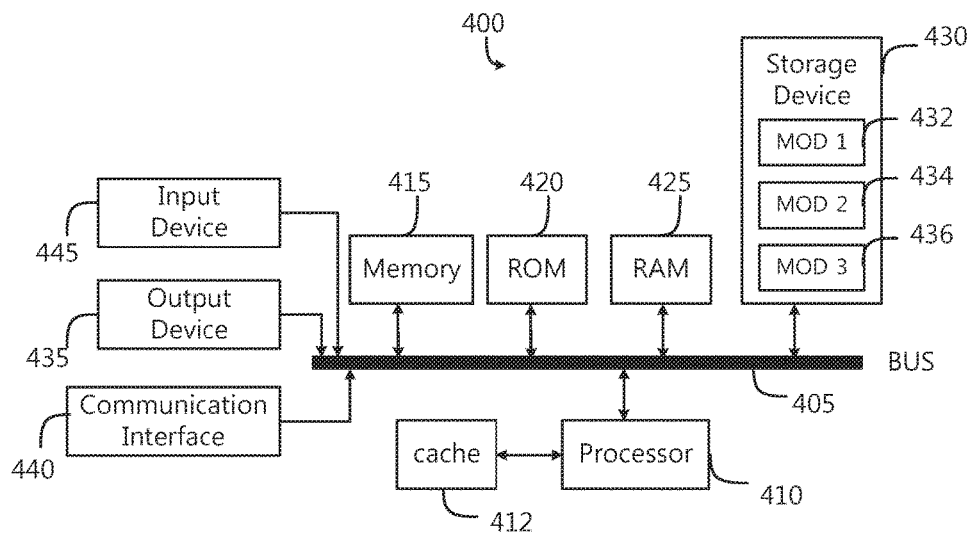
FIGS. 4 and 5 illustrate exemplary systems in accordance with various examples of the present technology.

In a network switch system, a lookup database can be maintained to keep track of routes between a number of end points attached to the switch system. However, end points can have various configurations and are associated with numerous tenants. These end-points can have various types of identifiers, e.g., IPv4, IPv6, or Layer-2. The lookup database has to be configured in different modes to handle different types of end-point identifiers. Some capacity of the lookup database is carved out to deal with different address types of incoming packets. Further, the lookup database on the network switch system is typically limited by 1K virtual routing and forwarding (VRFs). Therefore, an improved lookup algorithm is desired to handle various types of end-point identifiers. The disclosed technology addresses the need in the art for address lookups in a telecommunications network. Disclosed are systems, methods, and computer-readable storage media for unifying various types of end-point identifiers by mapping end-point identifiers to a uniform space and allowing different forms of lookups to be uniformly handled. A brief introductory description of example systems and networks, as illustrated in FIGS. 3 and 4, is disclosed herein. These variations shall be described herein as the various examples are set forth. The technology now turns to FIG. 3.

FIG. 3 illustrates an example computing device 300 suitable for implementing the present technology. Computing device 300 includes a master central processing unit (CPU) 362, interfaces 368, and a bus 315 (e.g., a PCI bus). When acting under the control of appropriate software or firmware, the CPU 362 is responsible for executing packet management, error detection, and/or routing functions, such as miscabling detection functions, for example. The CPU 362 preferably accomplishes all these functions under the control of software including an operating system and any appropriate applications software. CPU 362 can include one or more processors 363 such as a processor from the Motorola family of microprocessors or the MIPS family of microprocessors. In an alternative example, processor 363 is specially designed hardware for controlling the operations of the computing device 300. In a specific example, a memory 361 (such as non-volatile RAM and/or ROM) also forms part of CPU 362. However, there are many different ways in which memory could be coupled to the system.

The interfaces 368 are typically provided as interface cards (sometimes referred to as "line cards"). Generally, they control the sending and receiving of data packets over the network and sometimes support other peripherals used with the computing device 300. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces can include ports appropriate for communication with the appropriate media. In some cases, they can also include an independent processor and, in some instances, volatile RAM. The independent processors can control such communications intensive tasks as packet switching, media control and management. By providing separate processors for the communications intensive tasks, these interfaces allow the master microprocessor 362 to efficiently perform routing computations, network diagnostics, security functions, etc.

Although the system shown in FIG. 3 is one specific computing device of the present technology, it is by no means the only network device architecture on which the present patent application can be implemented. For example, an architecture having a single processor that handles communications as well as routing computations, etc. is often used. Further, other types of interfaces and media could also be used with the router.

Regardless of the network device's configuration, it can employ one or more memories or memory modules (including memory 361) configured to store program instructions for the general-purpose network operations and mechanisms for roaming, route optimization and routing functions described herein. The program instructions can control the operation of an operating system and/or one or more applications, for example. The memory or memories can also be configured to store tables such as mobility binding, registration, and association tables, etc.

Figure 5:
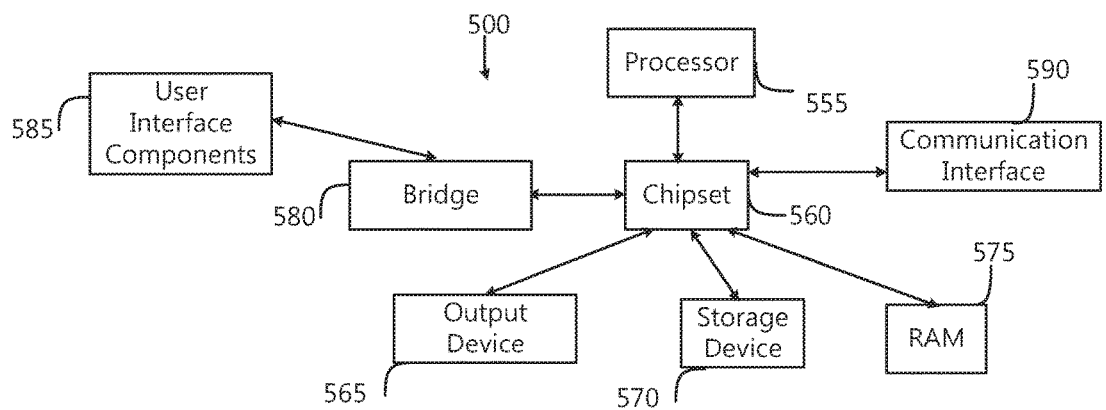

FIG. 4 and FIG. 5 illustrate example possible systems in accordance with various aspects of the present technology. The more appropriate example will be apparent to those of ordinary skill in the art when practicing the present technology. Persons of ordinary skill in the art will also readily appreciate that other system examples are possible.

FIG. 4 illustrates a computing system architecture 400 wherein the components of the system are in electrical communication with each other using a bus 405. Example system 400 includes a processing unit (CPU or processor) 410 and a system bus 405 that couples various system components including the system memory 415, such as read only memory (ROM) 420 and random access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 can be available for use as well. The memory 415 can include multiple different types of memory with different performance characteristics. The processor 410 can include any general purpose processor and a hardware module or software module, such as module 432, module 434, and module 436 stored in storage device 430, configured to control the processor 410 as well as a special-purpose processor where software instructions are incorporated into the actual processor design. The processor 410 can essentially be a completely self-contained computing system, containing multiple cores or processors, a bus, memory controller, cache, etc. A multi-core processor can be symmetric or asymmetric.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art. In some instances, multimodal systems can enable a user to provide multiple types of input to communicate with the computing device 400. The communications interface 440 can generally govern and manage the user input and system output. There is no restriction on operating on any particular hardware arrangement and therefore the basic features here can easily be substituted for improved hardware or firmware arrangements as they are developed. Any features or steps in any example of this patent application may be mixed with any other features or steps in any other examples.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include software modules 432, 434, 436 for controlling the processor 410. Other hardware or software modules are contemplated. The storage device 430 can be connected to the system bus 405. In one aspect, a hardware module that performs a particular function can include the software component stored in a computer-readable medium in connection with the necessary hardware components, such as the processor 410, bus 405, output device 435 (e.g., a display), and so forth, to carry out the function.

FIG. 5 illustrates a computer system 500 having a chipset architecture that can be used in executing the described method and generating and displaying a graphical user interface (GUI). Computer system 500 is an example of computer hardware, software, and firmware that can be used to implement the disclosed technology. System 500 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output device 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 500 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or RAM 575. Further, the machine can receive inputs from a user via user interface components 585 and execute appropriate functions, such as browsing functions by interpreting these inputs using processor 555.

It can be appreciated that example systems 400 and 500 can have more than one processor 410 or be part of a group or cluster of computing devices networked together to provide greater processing capability.

For clarity of explanation, in some instances the present technology can be presented as including individual functional blocks including functional blocks comprising devices, device components, steps or routines in a method embodied in software, or combinations of hardware and software.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Various aspects of the present technology provide systems and methods for remotely controlling zone management of a storage subsystem. While specific examples have been cited above showing how the optional operation can be employed in different instructions, other examples can incorporate the optional operation into different instructions. For clarity of explanation, in some instances the present technology can be presented as including individual functional blocks including functional blocks comprising devices, device components, steps or routines in a method embodied in software, or combinations of hardware and software.

The various examples can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

To the extent examples, or portions thereof, are implemented in hardware, the present patent application can be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Most examples utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network and any combination thereof.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these technologies can comprise hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

In examples utilizing a Web server, the Web server can run any of a variety of server or mid-tier applications, including HTTP servers, FTP servers, CGI servers, data servers, Java servers and business application servers. The server(s) can also be capable of executing programs or scripts in response requests from user devices, such as by executing one or more Web applications that can be implemented as one or more scripts or programs written in any programming language, such as Java®, C, C# or C++ or any scripting language, such as Perl, Python or TCL, as well as combinations thereof. The server(s) can also include database servers, including without limitation those commercially available from open market.

The server farm can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system can also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate examples can have numerous variations from that described above. For example, customized hardware might also be used and/or particular elements might be implemented in hardware, software (including portable software, such as applets) or both. Further, connection to other computing devices such as network input/output devices can be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EPROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the technology and teachings provided herein, a person of ordinary skill in the art will appreciate other ways and/or methods to implement the various aspects of the present technology.

The specification and drawings are, accordingly, to be regarded in an illustrative rather than a restrictive sense. It will, however, be evident that various modifications and changes can be made thereunto without departing from the broader spirit and scope of the patent application as set forth in the claims.

What is claimed is:

1. A computer-implemented method for a server system, comprising:
    causing a basic input/output system (BIOS) boot order of the server system to be set at an Internet Small Computer System Interface (iSCSI) network interface controller (NIC) of the server system, the iSCSI NIC configured to receive the BIOS boot order from a network coupled to the server system;
    causing an iSCSI boot configuration to be synced to a management controller of the server system, the management controller configured to receive the iSCSI boot configuration from the network;
    updating, by the management controller, the BIOS boot order based at least upon the iSCSI boot configuration stored at the management controller and performance of the server system, wherein the performance of the server system comprises parameters of temperature, cooling fan speeds, power status, memory and operating system status;
    syncing the iSCSI boot configuration from the management controller to a BIOS of the server system; and
    booting the server system from a specific target IP and a Logical Unit Number (LUN) of an iSCSI storage device of a Storage Area Network (SAN), the SAN coupled to the server system via the network, the booting comprising booting an iSCSI loader service of the server system from the specific target IP and the LUN of the iSCSI storage device, causing the iSCSI loader service to get a target operating system (OS) image from the specific target IP and the LUN of the iSCSI storage device, and causing the iSCSI loader to clone the target OS image to the server system.

2. The computer-implemented method of claim 1, wherein the NIC is an iSCSI Host Bus Adapter (HBA).

3. The computer-implemented method of claim 2, further comprising:
    syncing the iSCSI boot configuration from the management controller to the iSCSI HBA.

4. The computer-implemented method of claim 1, wherein the iSCSI boot configuration is synced to the BIOS by the BIOS or the management controller of the server system.

5. The computer-implemented method of claim 1, wherein the BIOS is a Unified Extensible Firmware Interface (UEFI) BIOS.

6. The computer-implemented method of claim 1, wherein the management controller is a baseboard management controller (BMC) or a rack management controller (RMC).

7. The computer-implemented method of claim 1, wherein the iSCSI loader service is a iSCSI boot deployment service of the server system and wherein the target OS image is cloned to a local disk of the server.

8. The computer-implemented method of claim 7, wherein the booting the server system comprises:
    booting the server system from the local disk of the server system.

9. The computer-implemented method of claim 1, wherein the iSCSI loader is a iSCSI diskless RAM disk loader of the server system and wherein the target OS image is cloned to a RAM of the server.

10. The computer-implemented method of claim 9, wherein the booting the server system comprises:
    causing an OS of the server system to be switched to the target OS image of the RAM.

11. The computer-implemented method of claim 1, wherein the iSCSI boot configuration comprises an iSCSI initiator name, iSCSI initiator configuration, iSCSI target information, and iSCSI Challenge Handshake Authentication (CHAP) configuration.

12. The computer-implemented method of claim 11, wherein the iSCSI initiator configuration comprises Dynamic Host Configuration Protocol (DHCP) settings, or a static IP, subnet mask and Gateway settings.

13. The computer-implemented method of claim 11, wherein the iSCSI target information includes a target name, target IP, and boot LUN.

14. A server system, comprising:
    a processor;
    a management controller; and a computer-readable medium storing instructions that, when executed by the processor, cause the server system to perform operations comprising:
    causing a basic input/output system (BIOS) boot order of the server system to be set at an Internet Small Computer System Interface (iSCSI) network interface controller (NIC) of the server system, the iSCSI NIC configured to receive the BIOS boot order from a network coupled to the server system;
    causing an iSCSI boot configuration to be synced to the management controller of the server system, the management controller configured to receive the iSCSI boot configuration from the network;
    updating, by the management controller, the BIOS boot order based at least upon the iSCSI boot configuration stored at the management controller and performance of the server system, wherein the performance of the server system comprises parameters of temperature, cooling fan speeds, power status, memory and operating system status;
    syncing the iSCSI boot configuration from the management controller to a BIOS of the server system; and
    booting the server system from a specific target IP and a Logical Unit Number (LUN) of an iSCSI storage device of a Storage Area Network (SAN), the SAN coupled to the server system via the network, the booting comprising booting an iSCSI loader service of the server system from the specific target IP and the LUN of the iSCSI storage device, causing the iSCSI loader service to get a target operating system (OS) image from the specific target IP and the LUN of the iSCSI storage device, and causing the iSCSI loader to clone the target OS image to the server system.

15. The server system of claim 14, wherein the iSCSI loader service is a iSCSI boot deployment service of the server system and wherein the target OS image is cloned to a local disk of the server.

16. The server system of claim 15, wherein the computer-readable medium storing instructions that, when executed by the processor, cause the server system to perform operations further comprising:
    booting the server system from the local disk of the server system.

17. The server system of claim 14, wherein the iSCSI loader is a iSCSI diskless RAM disk loader of the server system and wherein the target OS image is cloned to a RAM of the server.

18. The server system of claim 17, wherein the computer-readable medium storing instructions that, when executed by the processor, cause the server system to perform operations further comprising:
    causing an OS of the server system to be switched to the target OS image of the RAM.

19. The server system of claim 14, wherein the iSCSI boot configuration comprises an iSCSI initiator name, iSCSI initiator configuration, iSCSI target information, and iSCSI Challenge Handshake Authentication (CHAP) configuration.

20. The server system of claim 19, wherein the iSCSI initiator configuration comprises DHCP settings, or a static IP, subnet mask and Gateway settings.

* * * * *